United States Patent Office

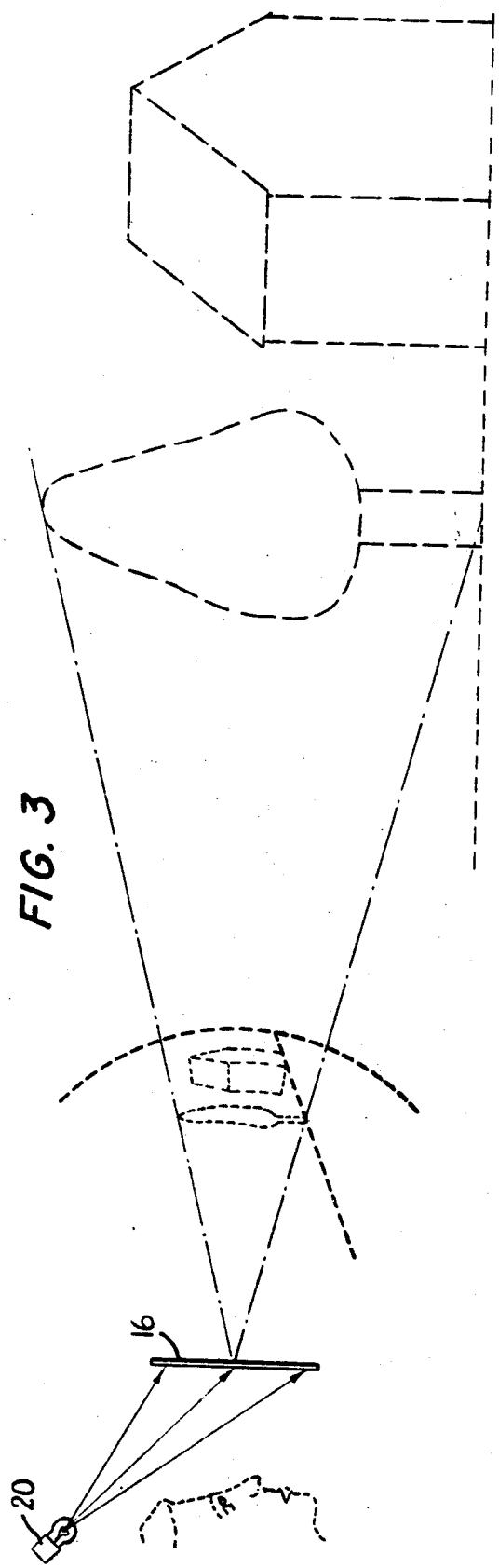
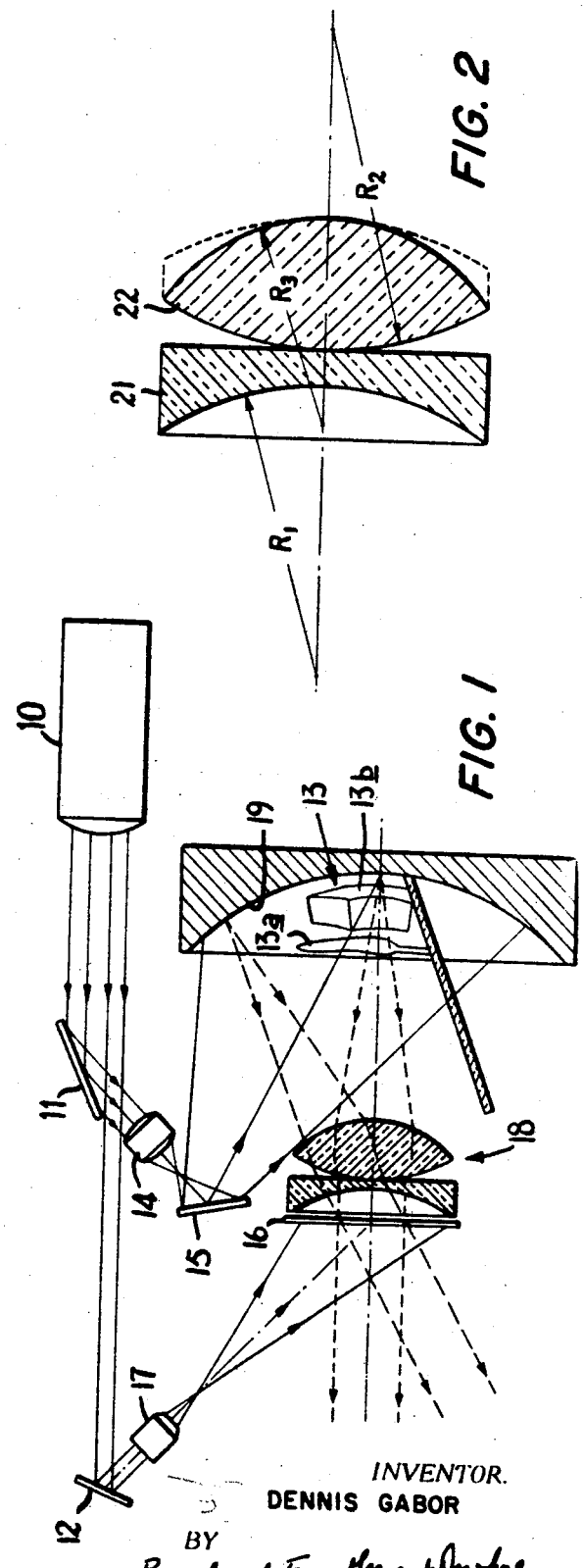

3,545,836
Patented Dec. 8, 1970

3,545,836
HOLOGRAPHIC PICTURES
Dennis Gabor, London, England, assignor to Columbia Broadcasting System, Inc., New York, N.Y., a corporation of New York
Filed Dec. 11, 1967, Ser. No. 689,501
Int. Cl. G02b 27/22
U.S. Cl. 350—3.5     12 Claims

ABSTRACT OF THE DISCLOSURE

As described herein, a hologram is provided in which the recorded scene is displayed as having unlimited depth. This unlimited depth effect is achieved by initially constructing a model of the scene to be displayed and reducing and distorting the model in such a way that its depth dimensions are at most a small multiple of the laser coherence length. Thereafter, this model is interposed between a corrected achromatic lens and a concave focal surface background and laser light is directed thereagainst. The light reflected by the model and the focal surface is then imaged onto one side of a thick emulsion photographic plate through the lens, the other side of the plate having a reference laser light directed thereagainst.

BACKGROUND OF THE INVENTION

This invention relates to holography and, more particularly, to holographic pictures which give the illusion of three-dimensional scenes of unlimited depth.

Hitherto the depth of holographic pictures was limited to the coherence length of laser light, or a small multiple thereof. In the taking of holograms the photographic medium is simultaneously illuminated by light coming from the object, and a reference wave. Holograms can be taken only if the optical paths, measured from the common source, of the two waves differ by less than the coherence length, otherwise there will be no interference fringes, but only a more or less blackening of the photographic medium, which contains no information. The coherence length for gas lasers is of the order of one foot, hence the depth of three-dimensional holograms is usually limited to about one foot. A small multiple of this has been achieved by dividing up the scene into a number of depth regions, each about one foot deep, and recording these either simultaneously, with a reference beam divided into several beams of different optical paths, or consecutively, on the same plane, by varying the optical path of the reference beam between two exposures. It has not been possible to record spatial scenes which give the impression of unlimited depth.

SUMMARY OF THE INVENTION

In the present invention, unlimited depth is achieved by interposing between the photographic medium and a model a suitable optical system increasing the apparent depth of the model. The optical system may comprise a plano-concave lens and a biconvex lens. The optical system focal surface lies behind the model of the scene to be ultimately represented. This model is reduced and distorted in such a way that its depth dimensions are at most a small multiple of the laser coherence length such that, when viewed through the optical system, the model appears as a deep spatial scene, with the correct dimensions and proportions.

BRIEF DESCRIPTION OF THE DRAWINGS

In the drawing:
FIG. 1 illustrates the optical arrangement for the recording of deep holograms;
FIG. 2 is an optical system suitable for the realization of the invention; and FIG. 3 illustrates the scene which the viewer will see in the hologram, recorded as in FIG. 1.

DESCRIPTION OF THE PREFERRED EMBODIMENT

In the illustrative embodiment arranged according to the invention, as shown in FIG. 1, coherent and intense light having essentially a single wave length generated by a laser 10 is split into two branches by means of reflecting mirrors 11 and 12. The first branch serves for the illumination of a model 13, shown as reduced and distorted models of a tree 13a and a house 13b, by means of a lens 14 and a further reflecting mirror 15. The second branch is used as a reference wave and illuminates a thick emulsion photographic plate 16 from the back, from a point-focus formed by a lens 17. It is understood that the photographic emulsion must be grainless or very fine-grained, "thick" to the extent that they are suitable for the taking of so-called deep or volume holograms for instance a silver halogen emulsion of the colloidal or Lippmann type.

The photographic medium 16 views the model 13 through an optical system 18 which is essentially a positive lens corrected in a certain way to be described later with a concave background surface 19, the optical system being located with its focal surface lying on the surface 19. The surface 19 has an approximately parabolic curvature conforming to the focal surface of the optical system, such that points on this surface appear at infinity when viewed through the optical system 18, just as the sky and horizon appear at infinity when viewed by the unaided eye. This is illustrated in FIG. 1 for two points, one on the axis, the other well outside it, by means of broken lines. Rays starting from such points are continued as parallel bundles in the space at the left of the optical system 18. The surface 19 throws light back, not as a mirror reflects, but to the extent that stars in the sky, clouds, or blue sky portrayed thereon give the impression of images our vision normally detects as being infinitely removed.

The model 13 is reduced laterally and distorted longitudinally along the optical axis in the same way as the optical space at the right of the optical system 18 is distorted in relation to the optical space at the left. In this way, distortion in the optical system 18 may be compensated. Specifically, the aligned points in a tree and a house are distorted in the models such that they are displaced equally from the focal surface 19. By Newton's law a point at a distance $d$ from the optic focal surface coinciding with surface 19 will appear to be at a distance from the focal point at the left equal to the square of the focal length $f$, divided by $d$. In particular, if $d$ is zero, the point will appear at infinity. In the neighborhood of the surface 19, the depth of the model components 13a and 13b is strongly reduced, as illustrated in FIG. 1, the depth of these models being at most a small multiple of the laser coherence length.

As an example, if the focal length is 20 inches, and the plate 16 is located as shown, a point 1 inch in front of the focal surface will appear at a distance of $20 \times 20/1 = 400$ inches from the left focus, about 380 inches from the center of the optical system or lens, and, assuming a lens 4 inches thick, about 382 inches from the plate 16. A point 10 inches in front of it will appear at $400/10 = 40$ inches from the left focus, about 20 inches from the lens center and 22 inches from the plate 16. In a panoramic picture, it is rather disturbing to have objects nearer than 20 inches from the eye; hence a whole model, which appears to extend from 20 inches to infinity can be built up in a depth of only 10 inches. A hologram of this can be taken with a single exposure of the plate 16 with a red helium-neon laser light, and then two to three exposures of the plate with blue and green lines of an argon-ion laser. Holograms in natural color, then, may be produced in this, or any other known manner, such as by simultaneous exposure of the plate 16 by the lasers just mentioned.

FIG. 3 shows what the viewer will see when he looks into the processed hologram, which is now illuminated by a white point-source 20. The model 13 now appears greatly enlarged laterally, and even more in depth, by the rule that the longitudinal magnification is the square of the lateral magnification. If the model was correctly reduced, he will now seen the scene in its natural dimensions.

The dimensions of the model can be precalculated by the above-mentioned optical rules, for example, according to Newton's law, by displacing those parts of the model which are to appear coplanar at substantialy equal distances from the surface 19. More easily perhaps, an artist can adjust the dimensions correctly by looking at the model through the optical system 18, and adjusting them until the dimensions appear correct to him. As the adjusted model appears to the artist looking through the lens, so will the reconstructed hologram appear to a viewer.

For all these applications, it is desirable to have holograms of rather large size, for instance 18x24 inches, and this requires special lenses, also of large size, of which an example is shown in FIG. 2.

The optical system 18 for the invention need not be of the quality of photographic lenses, that is to say it is not necessary to have stigmatic images of all the points in the model space, formed with the whole wide bundle of rays accepted by the lens. The reason is, that any point will be viewed only with two narrow bundles; those accepted by the pupils of the two eyes of the viewer. But though almost any achromatic lens is good enough to satisfy this criterion, in the case of an uncorrected lens, the viewer moving in front of the hologram will have the impression of an unnatural movement of the scene. The optical system 18 must be therefore sufficiently corrected to reduce these apparent movements to a minimum or to an unnoticeable level.

FIG. 2 is an example of a lens which satisfactorily fulfills these criteria. For a hologram diagonal of 12 units, its data are approximately as follows. The lens 21 may be a plano-concave lens of flint glass having a refractive index of 1.70, a dispersion of 30 and a radius $R_1$ of 15 units. The lens 22 may be a biconvex lens with a front radius $R_2$ of 18 units. The back radius $R_3$ in the center is 12 units, but in order to correct the spherical aberration, this is an aspherical surface, with a curvature diminishing toward the periphery as illustrated in broken lines in FIG. 2. This lens may be made of crown glass, refractive index about 1.52, or, because of its large bulk, preferably of acrylic resin, refractive index about 1.485, dispersion about 60. The thickness of the two lenses may be ½ unit and 4 units. This two-element lens system is corrected for spherical aberration (conventionally, by satisfying the able sine condition) coma (as just mentioned) and first-order achromatism (by the crown glass, flint glass combination described); it has a power of $f$:2.7 and can be used for angles of 30° off-axis, or even wider. It is not and need not be corected for field curvature. Distortion, as noted above, is corrected in the model. Astigmatism may be left uncorrected.

As lenses sufficient to cover holograms of the order of 30 inches diagonal are unavoidably rather expensive, artists and architects can prepare their models with small diameter lenses with the same optical properties, just wide enough for two eyes, say 3–4 inches, and take the models to be photographed to a holographic center which possesses a large diameter lens.

One application of the invention is a new medium for artists, transcending the limitations of sculpture, as they can now operate in an unlimited depth. Another application is for architects. Customers often complain that the finished buildings appear quite different from what they looked like when presented to them as small scale-models. They will now be in a position to present the buildings as if they were finished. A third application is to present real or realistic landscapes to the viewer, which give the illusion of a window opening out into the landscape, in natural colors.

Another novel use of the holograms constructed in accordance with the present invention is the mounting of such holograms in openings formed in the walls of an apartment, office or the like. By illuminating the hologram with strong white light a viewer looking through the hologram will be presented with a picture window showing of a scene in great depth. In this way, any room can become a room with a view notwithstanding the location of the apartment or the office.

The preparation of trees, shrubs and the like for models is rather laborious, and can be conveniently replaced by using cut-outs of lenticular three-dimensional pictures which can be inserted in the model. Lenticular three-dimensional photographs of the type which can be viewed at angles of ±15° or more from the normal without showing double views have usually depths of the order of a few centimeters only, but if these are used in positions in which the transverse magnification is of the order 10, so that a photograph of a tree appears enlarged to one meter, the depth is multiplied by a factor of 100, hence it will be also of the order of one meter. The same procedure can be applied also for inserting existing buildings into a model.

Although the invention has been described herein with reference to a specific embodiment, many modifications and variations therein will readily occur to those skilled in the art. All such variations and modifications are included within the intended scope of the invention as defined by the following claims.

I claim:

1. In apparatus for making a hologram adapted to present to a viewer the illusion of a scene of large depth from a model of said scene which is of lesser depth and is depth distorted, the improvement which comprises a thick emulsion photosensitive member, an optical means within the focal length of which the model is situated for passing to said photosensitive member light reflected from such a model and for compensating for said depth distortion by increasing the apparent depth of the scene, and means adapted to direct coherent light against said object and against said photosensitive member to record on the latter a hologram of said model without said depth distortion.

2. Apparatus as defined in claim 1 for making a hologram from a model which is also reduced in size, in which the optical means also provides means for compensating for said reduction by increasing the apparent size of scene component parts.

3. Apparatus as defined in claim 2, wherein the optical means defines a focal surface and the apparatus further includes a background surface conforming to and located at the focal surface behind said model to provide a background appearing infinitely removed relative to scene component parts spaced from the focal surface.

4. Apparatus according to claim 3, wherein said lens means comprises a lens corrected for spherical aberration, coma and first-order achromatism.

5. Apparatus according to claim 4, wherein said lens comprises a plano-concave lens and a biconvex lens, the forward surface of said bi-convex lens adjacent said plano-concave lens having a greater radius of curvature than the back surface thereof facing said model and said focal surface, and the back surface having an aspehrical shape, with the radius of curvature diminishing toward the periphery thereof.

6. Apparatus according to claim 5, wherein said focal surface and said background surface have a substantially parabolic curvature.

7. A method for making a hologram adapted to present to a viewer the illusion of a scene of large depth comprising the steps of providing within the focal length of optical correction apparatus a model of the scene which is of lesser depth, directing coherent light against a thick emulsion photosensitive member and against said model whereby image carrying light is reflected by said model to said photosensitive member, optically correcting light reflected from said model to said photosensitive member by increasing the apparent depth of the scene and utilizing said corrected light and said directed coherent light to record a hologram of said model on said photosensitive member.

8. A method as defined in claim 7 for recording a hologram from a model of a scene which is also reduced in size in which the step of optically correcting the light reflected from said model to said photosensitive member also includes optically correcting for said size reduction by increasing the apparent size of scene component parts.

9. A method as defined in claim 8, including the steps of depth distorting the model and the positioning of a lens system between said photosensitive member and the reflecting surface of a concave reflecting surface to optically compensate for said depth distortion.

10. A method as defined in claim 9 in which the lens system is corrected for spherical aberration, coma and first-order achromatism.

11. Apparatus for producing a hologram including photosensitive hologram recording means, a model of a scene to be recorded which is reduced in depth and spacing, means for exposing the recording means and model to light suitable for producing a holographic recording of the model in said photosensitive recording means, optical means within the focal length of which the model is situated, interposed in the path of light from the model to the recording means for increasing the apparent depth of the scene represented by the model and recorded in the recording means.

12. The apparatus according to claim 11, in which a background member is located behind the model, the background member has a surface conforming to and located at the optic focal surface, and points on the background member surface appear, viewed through the optical means, relatively infinitely remote.

References Cited

Kock et al.: Proceedings Letters, vol. 54, p. 1985, December 1966.

Leith et al.: Journal of the Society of Motion Picture and TV Engineers, vol. 75, No. 4, pp. 323–326, April 1966.

DAVID SCHONBERG, Primary Examiner

R. L. SHERMAN, Assistant Examiner

PO-1050
(5/69)

UNITED STATES PATENT OFFICE
CERTIFICATE OF CORRECTION

Patent No. 3,545,836         Dated December 8, 1970

Inventor(s)    Dennis Gabor

It is certified that error appears in the above-identified patent and that said Letters Patent are hereby corrected as shown below:

Column 3, line 51 after "periphery" should be -- , line 57, -- (as just mentioned) -- should be insert for "(conventionally - condition)"; line 58, -- (conventionally, by satisfying the Abbe sine condit -- should be substituted for "(as just mentioned)".

Signed and sealed this 29th day of June 1971.

(SEAL)
Attest:

EDWARD M. FLETCHER, JR.
Attesting Officer

WILLIAM E. SCHUYLER,
Commissioner of Pater